(12) United States Patent
Flotats Molinas

(10) Patent No.: US 10,820,619 B2
(45) Date of Patent: Nov. 3, 2020

(54) SQUEEZING SYSTEM

(71) Applicant: Zumex Group S.A., Moncada (ES)

(72) Inventor: Antonio Flotats Molinas, Barcelona (ES)

(73) Assignee: Zumex Group S.A., Moncada (ES)

( * ) Notice: Subject to any disclaimer, the term of this patent is extended or adjusted under 35 U.S.C. 154(b) by 624 days.

(21) Appl. No.: 14/909,070

(22) PCT Filed: Oct. 1, 2013

(86) PCT No.: PCT/EP2013/070494
§ 371 (c)(1),
(2) Date: Jan. 29, 2016

(87) PCT Pub. No.: WO2013/182712
PCT Pub. Date: Dec. 12, 2013

(65) Prior Publication Data
US 2016/0166102 A1   Jun. 16, 2016

(30) Foreign Application Priority Data

Jul. 31, 2013   (ES) .................................... 2527974

(51) Int. Cl.
*A23N 1/00* (2006.01)
*A47J 19/02* (2006.01)

(52) U.S. Cl.
CPC ............... *A23N 1/003* (2013.01); *A23N 1/00* (2013.01); *A47J 19/02* (2013.01)

(58) Field of Classification Search
CPC .......... A23N 1/003; A47J 19/02; A47J 19/022
USPC .................................................. 99/501–505
See application file for complete search history.

(56) References Cited

U.S. PATENT DOCUMENTS

| 2,853,107 | A | * | 9/1958 | Alexander | A23N 1/003 99/502 |
| 5,170,699 | A | * | 12/1992 | Senalada | A23N 1/003 99/504 |
| 6,318,252 | B1 | * | 11/2001 | Kao | A47J 19/022 100/125 |

* cited by examiner

*Primary Examiner* — Tu B Hoang
*Assistant Examiner* — Thomas J Ward
(74) *Attorney, Agent, or Firm* — Vedder Price P.C.; Michael J. Turgeon

(57) ABSTRACT

Squeezing system that comprises at least one female drum (1) and at least one male drum (2), one close to the other and which rotate in a synchronous manner, one in the opposite direction to the other, the female (1) having on its side at least one cavity (6) apt for lodging the fruit to be squeezed, and the male drum (2) likewise having on the side at least one protuberance (5) apt for engaging in a portion of the rotation path and apt for being tightly lodged in the cavity (6) of the female drum (1) during each rotation, compressing and squeezing the fruit; the rotation axle (3) of the female drum (1) not being parallel to the rotation axle (4) of the male drum (2), both crossing at a point in space, being preferably coplanar and concurrent and being deployed one with respect to the other at an angle other than 0° or 180°, in which the female (1) and male (2) drums have one of their bases larger than the other, preferably adopting a a frusto-conical shape.

6 Claims, 3 Drawing Sheets

SQUEEZING SYSTEM

This application claims the benefit of PCT/EP2013/070494 under 35 U.S.C. § 371. The contents of PCT/EP2013/070494 are hereby incorporated by reference herein in their entirety.

The present invention, as the name indicates, refers to a squeezing system of the type that comprises two elements, one a female element and the other a male element, both being rotational, one in the opposite direction to the other, making contact or almost making contact with a minimum constant lateral separation along the length of their respective sides.

The squeezing system is apt for fruits, greens and other vegetables, although in the present document the term "fruit" will be used comprehensively for all vegetables.

We will refer to elements such as female drum and male drum, understanding "drum" to be any of the following elements or situations:
  that the element itself adopts the shape of a drum
  that the rotation of the element delineates a drum shape
  that a space in the shape of a drum is required for the rotation of the element In any of these three situations we will say that the element has the shape of a drum and will refer to them as drum.

The female drum is the one that takes in the fruit to be squeezed in one or more cavities on its side, cavities that are apt for engaging the protuberance or protuberances that the male drum has on its side.

The female drum and the male drum rotate in opposite directions in a synchronised manner engaging during a portion of the travel and the protuberances of the male drum with the cavities of the female drum that carry the fruit to be squeezed facing each other in a position of the rotation; the squeezings being produced by the embedding and compression of the protuberances on the fruit.

It is characteristic of this squeezing system that the rotation axles of the female element and the male element are not parallel, but rather are deployed at an angle, said angle being other than 0° or 180°.

By rotation axle we will understand both the case of the axle that rotates in solidarity with the drum that it traverses, and the fixed axle that serves as support so that the drum can rotate over it.

The theoretical rotation axes of the male drum and female drum cross in space and, therefore, in order that the drums can make contact or almost make contact with a minimum constant separation longitudinally and along their respective lateral surfaces, the drums have one of their bases larger than the other one, adopting a frustoconical shape.

The rotation axles deployed at an angle are preferably coplanar and concurrent.

The sector of the art to which this invention pertains is that of machinery for preparing beverages.

BACKGROUND OF THE INVENTION

Different forms of fruit squeezers have been known for several years with this type of machinery being very extended for this use, especially in sectors such as hotels, restaurants, bars or catering, among others, and currently extending to nutritional foods distribution, such as services related to health in general, stores, gymnasiums or recreation, among others.

Among that machinery, machines having a squeezing system based on two drums, one male and one female, with parallel rotation axles between them, making contact or almost making contact with a minimum longitudinal separation and along the length of the respective lateral surfaces are very well known.

These drums rotate but do not move, it being the fruit being squeezed that must follow a specific path in order to be subjected to the action of the drums.

The female drum is what takes in the fruit to be squeezed in one or more cavities on the side, and which are suitable for engaging internally the protuberances that the male drum has on its side.

The female drum rotates in a synchronous manner with the male drum but in the opposite direction to it, being synchronised one with the other, engaging in a portion of the path so that in each rotation the protuberances on the male drum coincide with the cavities in the female drum, said protuberances being inserted in the cavities of the female drum that carries the fruit, the squeezing being produced by the embedding and compression of the protuberance of the male drum against the fruit lodged in the cavities of the female drum.

In this type of machinery it is common for the fruit to have been separated beforehand, preferably into two halves.

There are many examples of said machines, both with a single female element and a single male element, more than one female element and more than one male element, and one or several cavities in the female element and one or several protuberances in the male element, there being no reason for having the same the number of cavities and protuberances.

As examples of machines that incorporate two male elements and two female elements, we cite Spanish patents ES2008438 and ES2053357, Austrian patent AT507768 and Spanish Utility Model ES1019589U, all of which are based on female drums having rotation axles in parallel with the rotation axles of the male drums.

As examples of machines that incorporate a single male drum and a single female drum, we may cite, among others, Spanish patent ES2284294 or Spanish Utility Model ES1034325U, likewise based on two parallel axles, on one of which the female drum is mounted and on the other the male drum.

The system of drums with parallel rotating axles has some drawbacks, such as for example, it is necessary for the squeezing system to have a considerable size, specifically, studies that have been conducted point to a minimum size of 8.2 times the volume of the fruit for this type of squeezing system.

Likewise, the subsystems associated to the squeezing system as such occupy considerable space, such as the cutting or holding subsystem and the fruit guide, among others, such as the subsystems for feeding fruit to the cavities of the female element, the transmission subsystems for rotating the female and male elements, the synchronising of the cavities and the protuberances, or for extracting the rinds of the fruit.

Other drawbacks of the system for feeding the pieces of fruit to the cavities of the female drum are that the rejection and/or accumulation of fruit is common if the fruit is soft or has difference sizes, or a cutting subsystem that has a short guide and retention for accompanying after the cutting knife, requiring it to have a profile with a cross-section right after the cut, which causes the fruit to tear before the full cut of the knife is completed.

Another drawback is that a disjointed and laborious packaging assembly and disassembly of the entire system and subsystem is necessary for daily cleaning to avoid the growth of bacteria that is harmful to the health. Furthermore, as the axles are parallel and free at one of their ends, the squeezing force causes deformation due to bending of the rotating axles, which causes gaps between the male and female drums and, consequently, loss of efficacy during squeezing, or even breakages due to material fatigue.

U.S. Pat. Nos. 2,705,984 and 2,853,107 describe an squeezing machine with two rotatable units one of them, the pick up unit rotatable about a vertical axis comprising a serial of cups opened to its base, and a reamer unit rotatable about an axis inclined from the vertical. Those cups modify their shape and dimensions to catch the fruit and once the fruit is caught the cups return to their original shape.

Spanish patent ES3289890T3, translation of European patent EP2314174, proposes a frame that joins the two parallel rotation axles at their ends in a way that facilitates disassembly operations of the female and male elements and stiffens the assembly. However it does not solve the other drawbacks.

DESCRIPTION OF THE INVENTION

To solve the cited problems, a squeezing assembly is proposed that comprises the following:

At least one female drum and at least one male drum, their respective axles being deployed at an angle with respect to each other, that angle being other than 0° or 180°, their theoretical lines crossing in space, these lines being theoretical lines of the respective axes with respect to which they rotate preferably coplanar and, consequently, concurrently.

The female drum has one of its bases larger than the other, preferably having a frustoconical shape, and has on its sides at least one cavity, preferably hemispherical, apt for lodging a piece of fruit or portion thereof, there being the possibility of several cavities. The male drum has one of its bases larger than the other, preferably having a frustoconical shape, and has on its sides at least one protuberance apt for engaging during a portion of the rotating path and fitting in the cavities the female element has on its side, there being the possibility of several protuberances.

There is no reason for the number of cavities on the female drum to coincide with the number of protuberances on the male drum.

Both drums rotate in the opposite direction with respect of the other and engage on a portion of the rotation path.

The rotation of the drums is synchronised so that during a portion of the rotation they engage and in a position of the cycle during each rotation the cavities on the female drum coincide with the protuberances on the male drum in such a way that the protuberances are inserted into the cavities, even though the number of cavities on the female drum may be different from the number of protuberances on the male drum.

The synchronisation of the movement of the drums can be carried out in different manners or subsystems, one of them being the use of gears that relate the axles or the drums themselves.

In order to maintain the fruit in the cavity during its path towards the encounter with the protuberance on the male drum, the use of a guide and/or retaining subsystem is essential because the cavity does not modify its shape during the process of juicing There are various solutions for retaining the fruit such as for example, external guides, or saw teeth on the mouths of the cavities, awls in the interior where the fruit is inserted, or elements that accompany the fruit in its path keeping it settled in the cavity.

The use of a fruit cutting subsystem has also been seen to be advantageous although it is complementary and, just as occurs in the case of the half-guide and/or retainer, there are multiple solutions that can be opted for, being common among others the use of knives deployed in parallel to the side of the female drum.

The assembly of the final squeezer can comprise a single male element and a female element or more than one of each, but preferably the same number of male and female elements.

In the case of there being more than one female and male drum and if said drums are related to each other, it is preferable that both have the same size and rotate at the same speed, although embodiments are possible having different sizes and speeds between one drum and the other.

DESCRIPTION OF AN EMBODIMENT OF THE INVENTION

Figure 1:
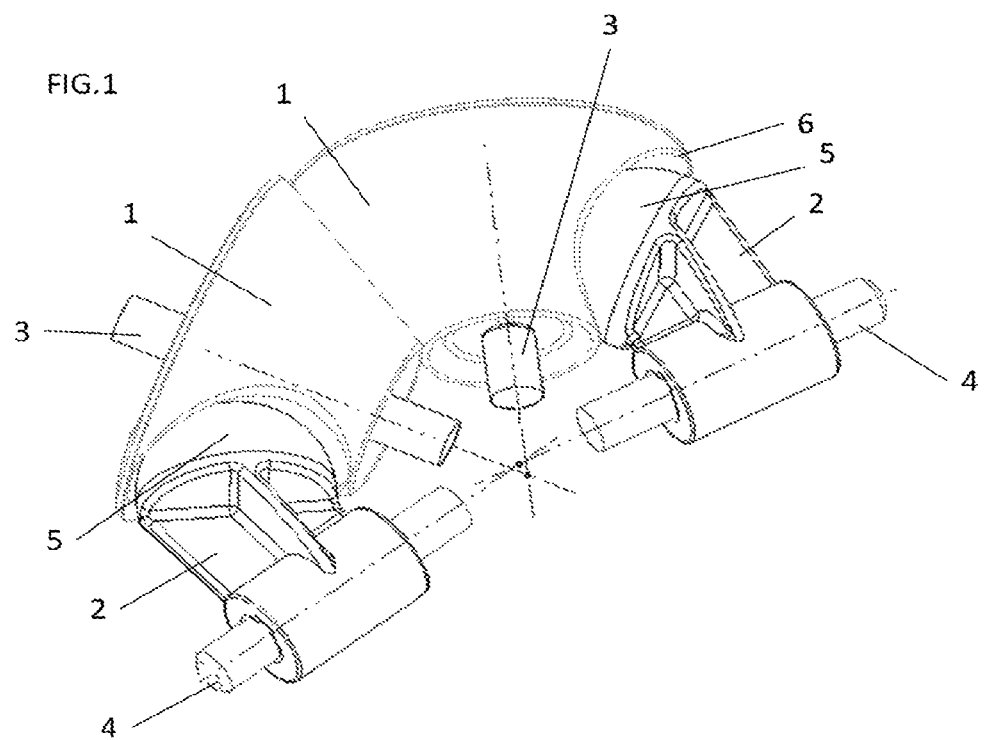
FIG. 1 displays a squeezing system in one embodiment out of all the possible ones, with two female drums (1) and two male drums (2) with the rotation axles of female drums (3) deployed in a non-parallel manner, at an angle with respect of the rotation axles of male drums (4), the assembly being at the moment of the cycle in which protuberances (5) of the male drums are lodged in cavities (6) of the female drums.

The following is a description of the invention, which is not the only one, but rather simply explanatory for the purpose of better understanding it.

For simplicity's sake the embodiment displayed in the figures will be used.

The squeezing system that is explained in this specific embodiment comprises:

Two female drums (1)
Two male drums (2)
Some rotation axles (3) of the female drums and some rotation axles (4) of the male drums deployed at an angle to each other.

In which the female drums:

Have a frustoconical shape and each one of them has on its side a cavity (6) apt for lodging the fruit to be squeezed.

The two female drums (1) have the same size and rotate at the same speed and in a synchronised manner between them.

Rotation axles (3) of the female drums (3) are not parallel to rotation axles (4) of the male drums, but rather are deployed at an angle.

Rotation axles (3) of the female drums are coplanar and concurrent.

The female drums rotate in a synchronous manner with respect of the male drums with which they are related.

Figure 2:
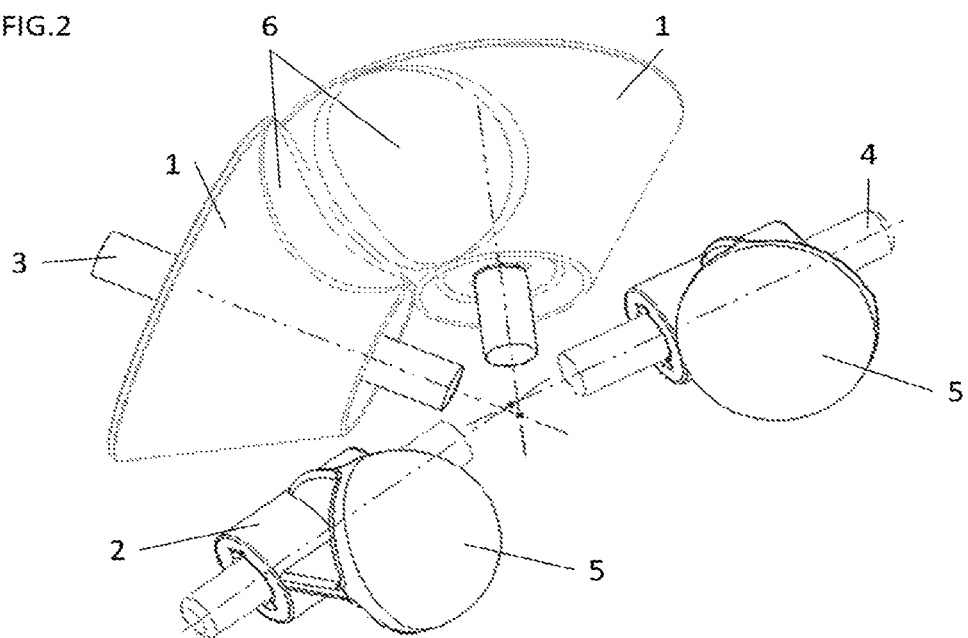
FIG. 2 displays the squeezing system in one embodiment out of all the possible ones, with two female drums (1) and two male drums (2) at a moment of the cycle in which cavities (6) of female drums (1) begin to face each other during their rotation path and show the maximum opening in order to be able to house fruit inside them, and protuberances (5) of male drums (2) are distanced from cavities (6) of female drums (1). Rotation axles (3) of the female drum and rotation axles (4) of the male drum are also visible.
Figure 3:
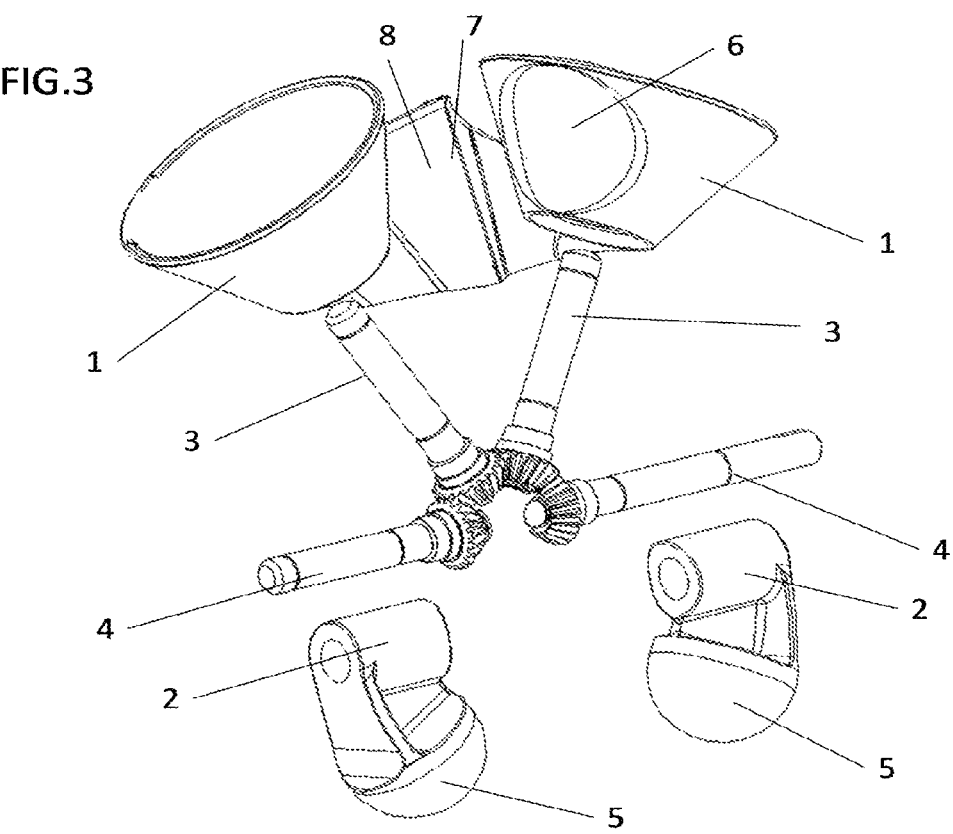
FIG. 3 displays an exploded view of the main components of the squeezing system and thus showing female drums (1), male drums (2), rotation axles (3) of the female drums, rotation axles (4) of the male drums, protuberances (5) of the male drums, cavities (6) of the female drums, as well as a possible execution of a guide and retention subsystem having a surface (7) that accompanies the cut fruit, as well as a possible execution of a cutting subsystem having a cutting wire (8).

As the female drums rotate in a synchronous manner, one in the opposite direction to the other and given the specific initial position, during each rotation cavities (6) of each one of the female drums coincide facing each other (FIG. 2)

Both female drums are close to each other and at a constant distance, their sides being parallel and almost adjoining the large bases of each one of them, as well as with the small bases of each one of them.

A guide and retention element (7) is located close to female drums having an accompanying surface for the cut fruit on its path and a cutting element that has a cutting wire (8) located between both drums.

In regard to the male drums:

Each one has a protuberance (5) apt for being lodged in cavities (6) of the female drums.

Rotation axles (4) of the male drums are not parallel to the rotation axles (3) of the female drums, but rather are deployed at an angle, being coplanar and concurrent.

The rotation axles of male drums (4) are coplanar and concurrent.

The rotation of the male drums is synchronised with the female drums with which they are are related.

Each male drum rotates in the opposite direction of the female drum with which it is related.

The squeezing system so defined has, the following cycle:

By the action of a feeding subsystem that can be forced by gravity or any other means—and which is not a subject of the present invention—the fruit is carried to the area between cavities (6) of both female drums at a moment in which cavities (6) are empty and are on the way to facing each other, as shown in FIG. 2.

Once there, the fruit is housed, embraced and trapped by the cavities which forcefully direct it towards a cutting wire (8), preferably located parallel to both female drums,—and which is not a subject of the present invention.

After being cut into two halves, each one of the fruit portions are maintained in their cavity, preferably with the contribution of guide and retention element (7),—which is not a subject of the present invention, and thus continue their path until, at the moment in the cycle shown in FIG. 1, the protuberances, embedding them in the cavities, are what retain, compress and squeeze the fruit.

After the squeezing, the rind or the remains of the fruit are expelled from the male drums with a system,—which is not a subject of the present invention—, and a new cycle starts.

To carry out the squeezing cycle in a globally automated manner, besides the cutting, guide and retention subsystems, it is recommended to have auxiliary subsystems such as feeding or rind extraction, among others, which are not shown in the present document as they are complementary to the squeezing process as such and common to many machines that already exist.

What is claimed:

1. A squeezing system comprising: at least one female drum and at least one male drum proximate to the female drum;
    wherein the at least one female drum and the at least one male drum rotate in a synchronised manner, and in an opposite direction to each other,
    the female drum having in a lateral side surface at least one cavity configured for lodging fruit to be squeezed and the male drum having on a side at least one protuberance configured for embedding during a portion of a rotation path and further configured for tightly lodging in the cavity of the female drum on each rotation compressing and squeezing the fruit, wherein:
    a first longitudinal axis of a rotation axle about which the female drum is disposed and rotates and a second longitudinal axis of a rotation axle about which the male drum is disposed and rotates and disposed such that the first longitudinal axis and the second longitudinal axis cross in space;
    the first longitudinal axis disposed with respect of the second longitudinal axis a relative angle other than 0°; and
    the first longitudinal axis disposed with respect of the second longitudinal axis a relative angle other than 180°.

2. A squeezing system in accordance with claim 1, wherein the female drum during its rotation forms a frusto-conical shape with one base larger than the other.

3. A squeezing system in accordance with claim 1, wherein the male drum during its rotation forms a frusto-conical shape with one base larger than the other.

4. A squeezing system in accordance with claim 1, wherein the first longitudinal axis and the second longitudinal axis are coplanar.

5. A squeezing system in accordance with claim 1, further comprising two female drums and two male drums.

6. A squeezing system in accordance with claim 5, wherein the female drums are facing each other by their respective side at a minimum constant distance and rotate in the opposite direction with respect of the other.

* * * * *